(12) United States Patent
Ortega Dona

(10) Patent No.: US 9,829,020 B2
(45) Date of Patent: Nov. 28, 2017

(54) COMPENSATOR NUT

(71) Applicant: ILLINOIS TOOL WORKS INC., Glenview, IL (US)

(72) Inventor: Raul Ortega Dona, Barcelona (ES)

(73) Assignee: ILLINOIS TOOL WORKS INC., Glenview, IL (US)

( * ) Notice: Subject to any disclaimer, the term of this patent is extended or adjusted under 35 U.S.C. 154(b) by 46 days.

(21) Appl. No.: 14/765,396

(22) PCT Filed: Jan. 29, 2014

(86) PCT No.: PCT/US2014/013481
§ 371 (c)(1),
(2) Date: Aug. 3, 2015

(87) PCT Pub. No.: WO2014/120707
PCT Pub. Date: Aug. 7, 2014

(65) Prior Publication Data
US 2015/0377266 A1 Dec. 31, 2015

(30) Foreign Application Priority Data
Feb. 4, 2013 (ES) .................................. 201300138

(51) Int. Cl.
*F16B 5/02* (2006.01)

(52) U.S. Cl.
CPC .......... *F16B 5/0233* (2013.01); *F16B 5/0283* (2013.01)

(58) Field of Classification Search
CPC ................................ F16B 5/0233; F16B 5/025
USPC ........................ 411/546, 535; 52/126.6, 263
See application file for complete search history.

(56) References Cited

U.S. PATENT DOCUMENTS

| 1,374,615 A | | 4/1921 | Talty | |
|---|---|---|---|---|
| 4,789,121 A | * | 12/1988 | Gidseg | F16M 7/00 248/188.2 |
| 5,340,258 A | * | 8/1994 | Simon | F16B 35/005 411/339 |
| 5,492,388 A | * | 2/1996 | Kawasaki | B62D 25/147 296/193.02 |
| 5,881,979 A | * | 3/1999 | Rozier, Jr. | F16M 7/00 248/188.4 |

(Continued)

FOREIGN PATENT DOCUMENTS

| DE | 8813271 U1 | 12/1988 |
|---|---|---|
| ES | 2412482 A1 | 7/2013 |
| FR | 2702506 A1 | 9/1994 |

OTHER PUBLICATIONS

ISR and WO for PCT/US2014/013481 mailed May 21, 2014.

*Primary Examiner* — Flemming Saether
(74) *Attorney, Agent, or Firm* — Hauptman Ham, LLP

(57) ABSTRACT

COMPENSATION NUT, of the type used to perform fixing together of two parts which may be joined together at a slightly variable distance while maintaining said distance separating them, used for example in motor vehicles in order to fix the supports of dashboards to the vehicle structure, said nut being formed by a combination of a top part, one or more intermediate nuts and a base clip or nut, which are provided with threads which allow mutual mating thereof and mutual retraction or extension thereof by means of a single screwing operation, said threads each being provided with stops which limit relative displacement thereof.

13 Claims, 3 Drawing Sheets

(56) References Cited

U.S. PATENT DOCUMENTS

| | | | | |
|---|---|---|---|---|
| 6,032,589 | A * | 3/2000 | Wang | F16M 7/00 |
| | | | | 108/147.11 |
| 6,062,791 | A * | 5/2000 | Simon | F16B 5/0233 |
| | | | | 411/432 |
| 6,238,123 | B1 | 5/2001 | Schwarzbich | |
| 6,431,602 | B1 * | 8/2002 | Ralko | B60K 5/12 |
| | | | | 280/781 |
| 6,669,422 | B1 * | 12/2003 | Sterle | F16B 5/0233 |
| | | | | 411/178 |
| 7,086,801 | B2 * | 8/2006 | Swahn | B60K 37/00 |
| | | | | 403/118 |
| 7,179,037 | B2 * | 2/2007 | Aukzemas | F16B 5/0208 |
| | | | | 411/107 |
| 7,296,947 | B2 * | 11/2007 | Schmieder | B62D 25/147 |
| | | | | 403/109.5 |
| 8,122,612 | B2 * | 2/2012 | Knight, III | E04D 11/007 |
| | | | | 33/199 R |
| 8,202,033 | B2 * | 6/2012 | Choi | B62D 25/147 |
| | | | | 411/535 |
| 8,337,132 | B2 * | 12/2012 | Steffenfauseweh | B60Q 1/0433 |
| | | | | 403/408.1 |
| 8,601,749 | B2 * | 12/2013 | Von Hoyningen Huene | E04B 2/745 |
| | | | | 182/188 |
| 2010/0303582 | A1 | 12/2010 | Choi et al. | |
| 2011/0243655 | A1 | 10/2011 | Binder et al. | |
| 2014/0328645 | A1 | 11/2014 | Arisa Busquets | |

\* cited by examiner

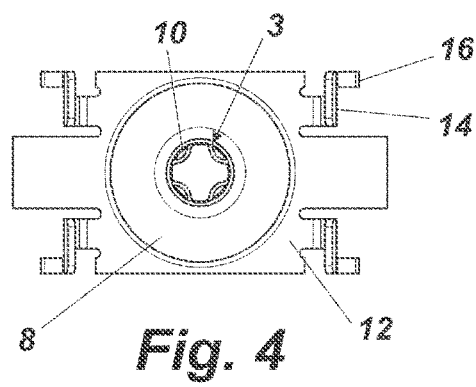
Fig. 4
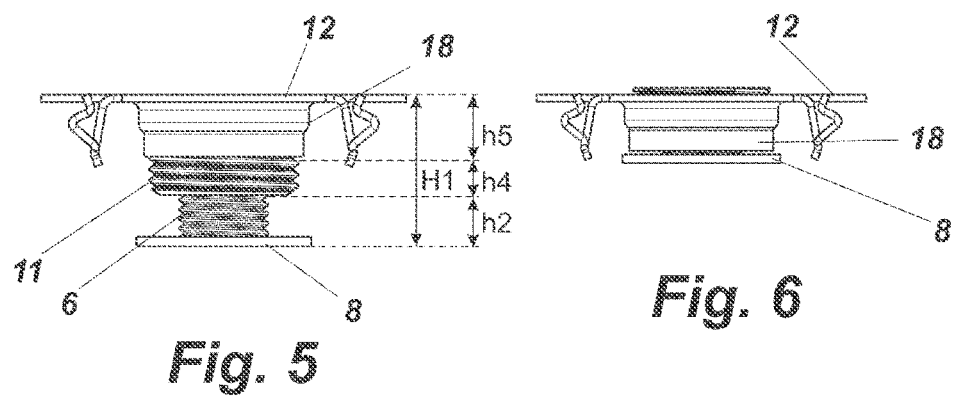
Fig. 5
Fig. 6

COMPENSATOR NUT

RELATED APPLICATIONS

The present application is a National Phase of International Application Number PCT/US2014/013481 filed Jan. 29, 2014 and claims priority to Spanish Application Number P201300138 filed Feb. 4, 2013.

FIELD OF THE INVENTION

The present invention relates to a compensation nut of the type consisting of devices which are used for securing fittings to a panel or the like, whereby a variable distance must be maintained between the panel and the fixing base, in order to prevent the panel from collapsing when the fitting is fixed, said nut being used, for example, in motor vehicles for fixing the supports of dashboards to the vehicle structure, with the particular feature that a set of concentric and mutually cooperating nuts are provided so as to allow use thereof within a wide range of mounting distances.

PRIOR ART

In the automobile industry it is frequently required to secure fittings where the fixing point may be located at a variable distance from the point where mounting is performed and where said fixing operation is to be performed without varying the aforementioned separating distance. In the prior art, for this purpose it was customary to use as a spacer a cylindrical tube which is fixed by means of welding to the pillar "A" of the vehicle, leaving a clearance inside the pillar. By means of a long shaft screw which passes through the cylinder the dashboard support and the bodywork pillar are fixed together.

Due to the manufacturing tolerance of the parts which must be joined together, the distance separating them is not always the same and the compensation device must adapt to this variation in distance without causing, during tightening, collapse of the dashboard, panel or fitting to be fixed. In order to overcome this problem, the prior art proposed an alternative solution which uses a long shaft screw with a tolerance adjustment system for preventing the panel from being deformed or collapsing when fixing or application of the specific tightening torque is performed.

Such long shaft screw devices with tolerance adjustment, however, are complex and heavy devices. Spanish patent application P 201101246 has as one of its main objects that of providing a compensation device which uses less material, is lighter and has a better response to vibrations. It describes a first part with an external and internal thread inside which the fixing screw mates, the external thread mating with the internal thread of a base which includes elements for performing fixing to its securing surface. Tightening of the screw results in the relative movement of the two parts with respect to each other over the zone separating the base or pillar and the fixing point.

One of the advantages of said invention is that of achieving a significant reduction in the amount of material—and consequently in weight—owing to the fact that the thickness of the wall of its first part is reduced, being functionally divided alternately between formation of the internal thread and formation of the external thread.

However, these types of devices have the problem that, when they must be used for large distances, they must also be manufactured large in size, with long, threaded compensation cylinders, resulting in an increase in the weight of the part obtained therefrom and increase in the corresponding cost. Moreover, if for example two sets of compensation nuts—for example a short one and long one—are manufactured, this gives rise to a range of situations which increase in number depending on the aforementioned manufacturing tolerances and where it is not clear which is the most suitable size; the operator therefore wastes time mounting and removing the compensation nut or, even worse, does not find a size of said nut which is perfectly adapted to the real conditions involved.

It is therefore the main object of the present invention to provide a compensation nut which can be adapted to a greater number of heights where compensation is required, without this involving the design of a different-sized part.

Another object of the present invention is that said compensation nut should be easy to use and quick to mount.

These and other advantages of the invention will become clearer during the course of the description thereof provided below.

BRIEF DESCRIPTION OF THE INVENTION

The present invention describes a compensation nut formed by the combination of a top nut with an internal bush for engagement with a screw, one or more intermediate nuts and a clip nut or base nut.

The base nut has means for performing fixing to a fixing surface, for example a part of the bodywork of a motor vehicle, such as surfaces suitable for allowing welding or articulated lugs for engaging with the edges of the mounting hole. This base nut also has a internal fillet or thread inside which the external thread of the first of the intermediate nuts mates.

These intermediate nuts have an internal thread of reduced height inside which the following intermediate nut may mate or, if it is the last intermediate nut, the external thread of the top nut thread may mate.

It is thus possible to obtain a compensation nut with various intermediate nuts nested together in a telescopic arrangement which has a minimum overall height when all the nuts are retracted and a maximum height when the nuts are extended as far as possible.

The compensation nut according to the invention is light, easy to mount and covers a wide range of heights greater than that obtained with the prior art, thus achieving all the predefined objects.

BRIEF DESCRIPTION OF THE DRAWINGS

In order to facilitate understanding of the invention the latter is accompanied by three sheets of drawings provided solely by way of a non-limiting example of said invention.

FIG. 4 shows a top plan view of the compensation nut according to the preceding figures.

FIGS. 5 and 6 each show a front elevation view of a compensation nut according to the preferred embodiment of the invention shown in the preceding figures, in two end positions, i.e. fully extended condition and fully retracted condition along the height of the nut.

DETAILED DESCRIPTION OF THE INVENTION

Figure 1:
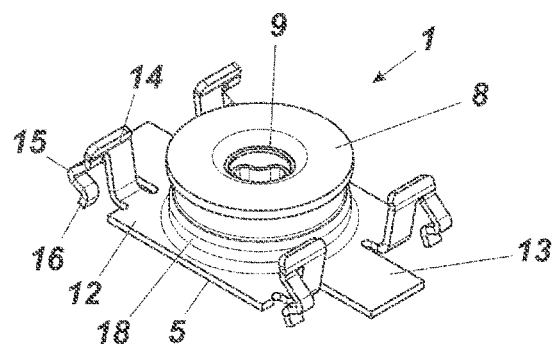
FIG. 1 shows a perspective view of one of the possible embodiments of the present invention, with its parts interconnected, without the screw for fixing the fitting.
Figure 2:
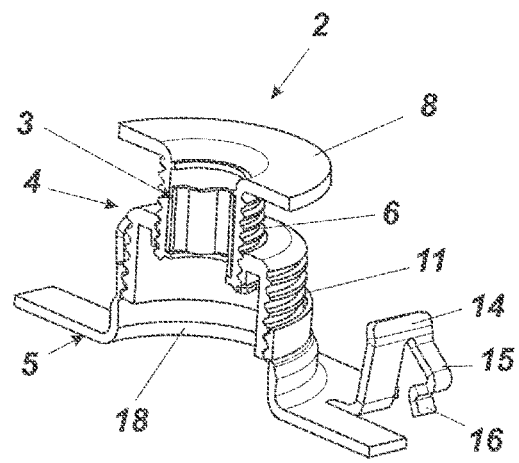
FIG. 2 shows a cross-sectional perspective view of a compensation nut as shown in the preceding figure.
Figure 3:
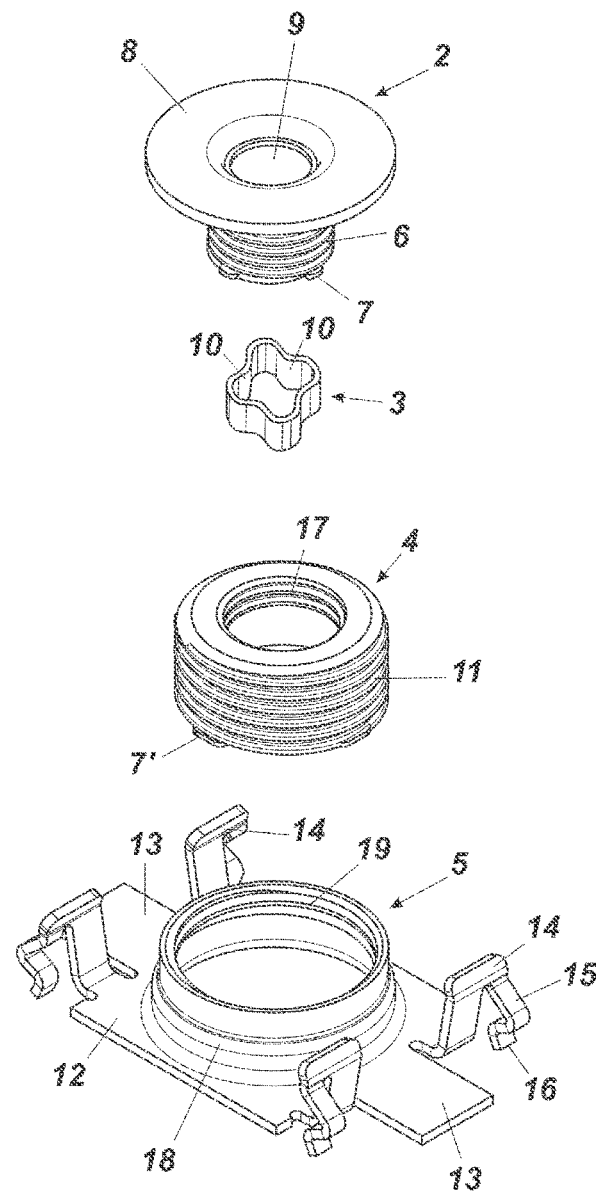
FIG. 3 is an exploded view of the compensation nut according to the preceding figures with its parts separated and in sequence.

The present invention consists of a compensation nut (1) of the type which are used to perform fixing together of two parts which may be joined together at a slightly variable distance while maintaining said distance separating them, used for example in motor vehicles in order to fix the supports of dashboards to the vehicle structure, being formed by the combination of a top part (2), an internal nut bush (3), at least one intermediate nut (4) and a base clip or nut (5).

As shown in the figures accompanying the invention, the top part or nut (2) has an outer surface (8) which acts as a support for mounting the fitting, with a central through-hole (9) continuously communicating with a cylinder having an external thread (6). Each cylinder has a number of stops (7) on its end part.

The internal nut bush (3) is a part which allows configuration of the internal thread for the top nut (2) without affecting the thickness of the walls of its cylinder. It is thus possible to construct the part (2) with a smaller thickness than if, on the contrary, the thickness of said cylindrical wall were to be used for the formation of both the internal thread and the external thread. In the preferred embodiment of the invention this bush is in the form of a rosette provided with one or more surfaces (10) configured for engagement with a tightening screw which is to be used with the compensation nut according to the invention and which, for the sake of simplicity, is not shown in the drawings nor need be further described in this specification.

The compensation nut according to the invention has moreover at least one intermediate nut (4). This intermediate thread has a double thread, i.e. external thread (11) and internal thread (17). Stops (7') are also provided at the bottom. The internal thread preferably consists of a few turns of a thread, namely has a small height, such that the general thickness of the intermediate part or nut is limited since it is not required to support over its entire height an external thread (11) and said internal thread (17).

Finally there is a base part or nut which has the function of being fixed to the support base supporting the fitting. In the preferred embodiment shown in the drawings it consists of a clip nut (5) formed by a flat base (12) having a centrally protruding cylinder (18) with an internal nut (19). This clip nut (5) has lugs (14) with bearing flanges (15) and disengaging tongues (16). It also has surfaces (13) suitable for welding the part to the fixing base.

The clip nut (5) according to the preferred embodiment shown in the drawings accompanying the present specification is intended to be mounted on a surface with a hole for inserting the clip nut (5). It is in this context that the lugs (14) perform their function. The part is operated solely on one side, i.e. the side for mounting the fitting. The operator engages the clip nut (5) inside the hole of the panel or bottom fixing surface by means of the lugs (14), it also being possible to perform additional fixing by means of welding on the side surfaces (13).

The ease of mounting of the compensation nut (1) according to the invention is such that the operator must merely introduce said compensation nut inside the gap or height where compensation is required, then engage the clip nut (5) inside the bottom hole and then introduce the screw for fixing the fitting via the outer side. The same operation of screwing, used for retraction, is also used for performing relative extension of the various parts which form the compensation nut (1) until the entire height of the compensation gap is covered. In at least some exemplary embodiments, the threads of the compensation nut allow mutual mating of the various components and mutual retraction or extension of the various components by means of a single screwing operation. Subsequent tightening firmly secures the fitting on the already fixed compensation nut.

As can be seen from FIGS. 5 and 6, the present application includes among its advantages the possibility of covering or compensating for distances or heights greater than those of the prior art, owing to its nested-nut mechanism of the telescopic type. For example and in accordance with the preferred embodiment of the invention shown in the drawings, with solely a single intermediate nut (4) an increase in the extension height of the nut, "H1", is achieved. The prior art obtained a height "H1" which was the sum of the heights "h5" and "h2", namely the respective heights of the base nut (5) and the top nut (2).

On the other hand, in the present invention, the maximum height of the extended compensation nut "H1" is composed of the previous sum "h5+h2" and the height of the intermediate nut (4) which is "h4". In this way, said total height differs from the prior art by the height "h4" of the intermediate nut (4). This total height "H1" may be reduced operationally, upon total retraction of the compensation nut (1), as shown in FIG. 6, until the height "h5" corresponds approximately to the height of the base nut (5).

The invention envisages that more than one intermediate nut (4) may be provided. In such a case the total additional height provided by said "n" intermediate nuts would be approximately n*h4, with the result that the range of heights which may be provided with a single compensation nut is considerably greater than that provided by the prior art.

The stops (7 and 7') of the top nut (2) and intermediate nut (4) ensure that the relative travel of a part displaceable inside the thread is not greater than the containing part. In other words, the intermediate nut (4) is unable to come out completely of the bottom clip nut (5), nor is the top nut (2) able to come out completely of the intermediate nut (4)

The invention envisages the use of any suitable material for producing all or some of its parts. For example, the top nut (2), intermediate nut (4) and base nut (5) may be made of steel, the bush (3) may be made of plastic, etc. The present invention is regarded as including any combination of material for the separate parts of the compensation nut (1) and any convenient and suitable material, preferably chosen from among those which are light, hard and resistant, and able to withstand vibrations.

In the same way, the invention may be provided in different configurations different from that shown in the drawings accompanying the present specification. In particular, compensation nuts (1) according to the present invention which incorporate a greater number of intermediate nuts (4), i.e. two, three, etc., may be provided.

It is understood that the constructional details and form of the present invention may be varied provided that they do not modify the basic idea of the invention.

What is claimed:

1. A COMPENSATION NUT, configured to perform fixing together of two parts which may be joined together at a slightly variable distance while maintaining said distance separating them, wherein the compensation nut is formed by a combination of a top part, one or more intermediate nuts and a base clip or nut, which are provided with threads which allow mutual mating thereof and mutual retraction or extension thereof upon rotational engagement of a tightening screw with the compensation nut.

2. THE COMPENSATION NUT as claimed in claim 1, wherein said top nut has an outer surface with a central through-hole continuously communicating with a cylinder having an external thread and a number of stops at its distal end.

3. THE COMPENSATION NUT as claimed in claim 1, wherein it is provided with an internal nut bush which has one or more surfaces configured for engagement of the tightening screw.

4. THE COMPENSATION NUT as claimed in claim 1, wherein said intermediate nuts have a double thread, i.e. external thread and internal thread, said external thread having stops at the bottom.

5. THE COMPENSATION NUT as claimed in claim 1, wherein internal thread of said intermediate nuts consists of a few turns of a thread.

6. THE COMPENSATION NUT as claimed in claim 1, wherein said base clip or nut is formed by a flat base having a centrally protruding cylinder with an internal nut.

7. THE COMPENSATION NUT as claimed in claim 1, wherein said base clip or nut has lugs with bearing flanges and disengaging tongues.

8. THE COMPENSATION NUT as claimed in claim 1, wherein said base clip or nut has surfaces suitable for welding the part to the fixing base.

9. THE COMPENSATION NUT as claimed in claim 1, wherein said thread of said intermediate nuts consists of two turns of the thread, and has a small height.

10. THE COMPENSATION NUT as claimed in claim 1, wherein said one or more intermediate nuts have an external thread and internal thread, said external thread having stops at the bottom.

11. THE COMPENSATION NUT as claimed in claim 10, wherein said internal thread of said intermediate nuts consists of a few turns of a thread, and has a small height.

12. THE COMPENSATION NUT as claimed in claim 10, wherein said internal thread of said intermediate nuts consists of two turns of a thread, and has a small height.

13. THE COMPENSATION NUT as claimed in claim 1, wherein the compensation nut is configured fix a support of a dashboard of a motor vehicle to the vehicle structure.

* * * * *